United States Patent
Ma et al.

(10) Patent No.: US 11,824,982 B1
(45) Date of Patent: Nov. 21, 2023

(54) KEY UPDATING METHOD AND APPARATUS, FILE SHARING METHOD AND APPARATUS, DEVICE, AND COMPUTER STORAGE MEDIUM

(71) Applicant: INSPUR SUZHOU INTELLIGENT TECHNOLOGY CO., LTD., Jiangsu (CN)

(72) Inventors: Fuqiang Ma, Jiangsu (CN); Zheng Xu, Jiangsu (CN); Guolu Gao, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/268,931

(22) PCT Filed: Nov. 29, 2021

(86) PCT No.: PCT/CN2021/134052
§ 371 (c)(1),
(2) Date: Jun. 21, 2023

(87) PCT Pub. No.: WO2023/010727
PCT Pub. Date: Feb. 9, 2023

(30) Foreign Application Priority Data

Aug. 6, 2021 (CN) .......................... 202110899392.X

(51) Int. Cl.
*H04L 9/08* (2006.01)
(52) U.S. Cl.
CPC .......... *H04L 9/0891* (2013.01); *H04L 9/0872* (2013.01)
(58) Field of Classification Search
CPC ........................... H04L 9/0891; H04L 9/0872
(Continued)

(56) References Cited

U.S. PATENT DOCUMENTS

2007/0274463 A1* 11/2007 Geldenbott ......... H04L 65/1069
379/37
2008/0154966 A1 6/2008 Geldenbott et al.
(Continued)

FOREIGN PATENT DOCUMENTS

CN 104009837 A 8/2014
CN 104796260 A 7/2015
(Continued)

OTHER PUBLICATIONS

Ke Yang. "A study of proxy re-encryption in cloud storage." Journal of Southwest University for Nationalities, 45(6), Nov. 30, 2019.

*Primary Examiner* — Dereena T Cattungal
(74) *Attorney, Agent, or Firm* — IPro, PLLC

(57) ABSTRACT

The present application discloses a key updating method and apparatus, a file sharing method and apparatus, a device, and a computer storage medium. The key updating method includes: acquiring a target root key and an auxiliary target root key; acquiring the identity information of a data owner of target data; acquiring a target timestamp when the target data is encrypted; acquiring a key generation parameter and an auxiliary key that are generated at a timestamp previous to the target timestamp; generating a target private key of the data owner on based on the key generation parameter and auxiliary key of the timestamp previous to the target timestamp, the identity information and the target timestamp, the key generation parameter generated at the timestamp previous to a starting timestamp being the target root key, the auxiliary key generated at the timestamp previous to the starting timestamp being the auxiliary target root key.

11 Claims, 6 Drawing Sheets

(58) Field of Classification Search
USPC .......................................................... 380/278
See application file for complete search history.

(56) References Cited

U.S. PATENT DOCUMENTS

| | | | |
|---|---|---|---|
| 2013/0124870 A1* | 5/2013 | Rosati .................. | H04L 9/3297 |
| | | | 713/168 |
| 2017/0093570 A1* | 3/2017 | Maruyama ............ | H04L 63/045 |
| 2017/0374070 A1 | 12/2017 | Shah et al. | |
| 2022/0094530 A1* | 3/2022 | Sreeravindra ........... | H04L 9/088 |
| 2022/0417241 A1* | 12/2022 | Zilbershtein .......... | H04L 9/3247 |

FOREIGN PATENT DOCUMENTS

| | | |
|---|---|---|
| CN | 110719295 A | 1/2020 |
| CN | 110958219 A | 4/2020 |
| CN | 111526197 A | 8/2020 |
| CN | 113346998 A | 9/2021 |

* cited by examiner

KEY UPDATING METHOD AND APPARATUS, FILE SHARING METHOD AND APPARATUS, DEVICE, AND COMPUTER STORAGE MEDIUM

CROSS-REFERENCE TO RELATED APPLICATION

The present disclosure claims priority to Chinese patent application No. 202110899392.X, titled "KEY UPDATING METHOD AND APPARATUS, FILE SHARING METHOD AND APPARATUS, DEVICE, AND COMPUTER STORAGE MEDIUM", filed on Aug. 6th, 2021 before the CNIPA, China National Intellectual Property Administration, which is incorporated herein in its entirety by reference.

TECHNICAL FIELD

The present disclosure relates to the field of data transmission, and more particularly, to a key updating method and apparatus, a file sharing method and apparatus, a device, and a computer storage medium.

BACKGROUND

With the rapid development of cloud computing technology, users store more and more data in a cloud computing environment. Since the cloud computing environment is a shared platform, the data stored in the cloud computing environment is no longer controlled by users, so the probability of being stolen by attackers is greatly increased. In order to enhance the privacy protection and data security in the cloud computing environment, the cryptography is used more and more extensively.

SUMMARY

The present disclosure is to provide a key updating method. The present disclosure further provides a key updating apparatus, a file sharing method and apparatus, a device, and a computer-readable storage medium.

In view of above, the following technical solutions of the present disclosure are provided.

A key updating method, including:

acquiring a target root key and an auxiliary target root key;

acquiring identity information of a data owner of target data;

acquiring a target timestamp when the target data is encrypted;

acquiring a key generation parameter and an auxiliary key that are generated at a timestamp previous to the target timestamp; and generating a target private key of the data owner based on the key generation parameter at the timestamp previous to the target timestamp, the auxiliary key at the timestamp previous to the target timestamp, the identity information and the target timestamp, wherein the key generation parameter generated at a timestamp previous to a starting timestamp is the target root key; and the auxiliary key generated at the timestamp previous to the starting timestamp is the auxiliary target root key;

wherein the generating a target private key of the data owner based on the key generation parameter at the timestamp previous to the target timestamp, the auxiliary key at the timestamp previous to the target timestamp, the identity information and the target timestamp includes:

generating key metadata at the target timestamp by performing a Hash operation on the key generation parameter generated at the timestamp previous to the target timestamp and the auxiliary key generated at the timestamp previous to the target timestamp;

generating the auxiliary key at the target timestamp by performing a Hash operation on the auxiliary key generated at the timestamp previous to the target timestamp and the target timestamp; and generating the target private key of the data owner based on a first half of the key metadata at the target timestamp, the auxiliary key at the target timestamp, the identity information and the target timestamp, wherein the key generation parameter generated at the timestamp previous to the target timestamp is a second half of the key metadata generated at the timestamp previous to the target timestamp.

In some embodiments, the generating the target private key of the data owner based on a first half of the key metadata at the target timestamp, the auxiliary key at the target timestamp, the identity information and the target timestamp includes:

calculating a Hash value of the identity information and the target timestamp;

calculating a product value of the auxiliary key at the target timestamp and the Hash value; and using a sum of the first half of the key metadata at the target timestamp and the product value as the target private key of the data owner.

In some embodiments, types of the target private key include a target symmetric key, and a target asymmetric private key, wherein in response to the target private key being the target symmetric key, the target root key is a target symmetric root key, and the auxiliary target root key is an auxiliary symmetric root key; and in response to the target private key being the target asymmetric private key, the target root key is a target asymmetric root key, and the auxiliary target root key is an auxiliary asymmetric root key.

In some embodiments, after the generating a target private key of the data owner based on the key generation parameter at the timestamp previous to the target timestamp, the auxiliary key at the timestamp previous to the target timestamp, the identity information and the target timestamp, the method further includes:

in response to the target private key being the target asymmetric private key, generating a target asymmetric public key based on the target asymmetric private key.

A file sharing method applied to a key management system, including: acquiring a target asymmetric public key of a data user at a current timestamp;

acquiring a target timestamp of a target encrypted shared file;

determining a target asymmetric private key of a data owner at the target timestamp through a key updating method, wherein a target asymmetric public key corresponding to the target asymmetric private key of the data owner is used to encrypt a target symmetric key of the data owner to obtain an encrypted target symmetric key, and the target symmetric key of the data owner is used to generate the target encrypted shared file;

generating, through a proxy re-encryption method, a proxy re-encryption key based on the target asymmetric public key of the data user and the target asymmetric private key of the data owner;

transmitting the proxy re-encryption key to a cloud storage service system, such that the cloud storage service system obtains proxy re-encrypted data by re-encrypting the encrypted target symmetric key based on the proxy re-encryption key, and transmits the proxy re-encrypted data and the target encrypted shared file to the data user;

wherein the key updating method includes: acquiring a target root key and an auxiliary target root key; acquiring identity information of the data owner of target data; acquiring the target timestamp when the target data is encrypted; acquiring a key generation parameter and an auxiliary key that are generated at a timestamp previous to the target timestamp; and generating the target private key of the data owner based on the key generation parameter at the timestamp previous to the target timestamp, the auxiliary key at the timestamp previous to the target timestamp, the identity information and the target timestamp, wherein the key generation parameter generated at a timestamp previous to a starting timestamp is the target root key, and the auxiliary key generated at the timestamp previous to the starting timestamp is the auxiliary target root key; and wherein the generating the target private key of the data owner based on the key generation parameter at the timestamp previous to the target timestamp, the auxiliary key at the timestamp previous to the target timestamp, the identity information and the target timestamp includes: generating key metadata at the target timestamp by performing a Hash operation on the key generation parameter generated at the timestamp previous to the target timestamp and the auxiliary key generated at the timestamp previous to the target timestamp; generating the auxiliary key at the target timestamp by performing a Hash operation on the auxiliary key generated at the timestamp previous to the target timestamp and the target timestamp; and generating the target private key of the data owner based on a first half of the key metadata at the target timestamp, the auxiliary key at the target timestamp, the identity information and the target timestamp, wherein the key generation parameter generated at the timestamp previous to the target timestamp is a second half of the key metadata generated at the timestamp previous to the target timestamp.

In some embodiments, the generating, through a proxy re-encryption method, a proxy re-encryption key based on the target asymmetric public key of the data user and the target asymmetric private key of the data owner includes: using the proxy re-encryption method to generate, based on the target asymmetric public key of the data user and the target asymmetric private key of the data owner, the proxy re-encryption key according to a proxy re-encryption key generation formula, the proxy re-encryption key generation formula includes:

$$rk_{a_{t1} \to b_{t2}} = (1/\alpha_{t1})pk_{b_{t2}};$$

wherein $rk_{a_{t1} \to b_{t2}}$ represents the proxy re-encryption key; $t_1$ represents the target timestamp; $\alpha_{t1}$ represents the target asymmetric private key of the data owner; $t_2$ represents the current timestamp; $pk_{b_{t2}}$ represents the target asymmetric public key of the data user; $pk_{b_{t2}} = b_{t2}P$, $b_{t2}$ represents the target asymmetric private key of the data user; and P represents a base point of a pre-generated elliptic curve.

In some embodiments, before acquiring a target asymmetric public key of a data user at a current timestamp, the method further includes:

acquiring identity information of the data user transmitted from the cloud storage service system;

acquiring authorized user information set by the data owner on metadata of an asymmetric key;

determining whether the identity information of the data user is in the authorized user information; and determining that the data user has a permission to use the target encrypted shared file in response to the identity information of the data user being in the authorized user information, and acquiring the target asymmetric public key of the data user at the latest target timestamp.

A key updating apparatus, including:

a first acquisition module, configured to acquire a target root key and an auxiliary target root key;

a second acquisition module, configured to acquire identity information of a data owner of target data;

a third acquisition module, configured to acquire a target timestamp when the target data is encrypted;

a fourth acquisition module, configured to acquire a key generation parameter and an auxiliary key that are generated at a timestamp previous to the target timestamp; and a first generation module, configured to generate a target private key of the data owner based on the key generation parameter at the timestamp previous to the target timestamp, the auxiliary key at the timestamp previous to the target timestamp, the identity information and the target timestamp, wherein the key generation parameter generated at a timestamp previous to a starting timestamp is the target root key; and the auxiliary key generated at the timestamp previous to the starting timestamp is the auxiliary target root key;

wherein the first generation module includes:

a first generation unit, configured to generate key metadata at the target timestamp by performing a Hash operation on the key generation parameter generated at the timestamp previous to the target timestamp and the auxiliary key generated at the timestamp previous to the target timestamp;

a second generation unit, configured to generate the auxiliary key at the target timestamp by performing a Hash operation on the auxiliary key generated at the timestamp previous to the target timestamp and the target timestamp; and a third generation unit, configured to generate the target private key of the data owner based on a first half of the key metadata at the target timestamp, the auxiliary key at the target timestamp, the identity information and the target timestamp, wherein the key generation parameter generated at the timestamp previous to the target timestamp is a second half of the key metadata generated at the timestamp previous to the target timestamp.

A file sharing apparatus applied to a key management system, including:

a fifth acquisition module, configured to acquire a target asymmetric public key of a data user at a current timestamp;

a sixth acquisition module, configured to acquire a target timestamp of a target encrypted shared file;

a first determination module, configured to determine a target asymmetric private key of a data owner at the target timestamp through a key updating method, wherein a target asymmetric public key corresponding to the target asymmetric private key of the data owner is used to encrypt a target symmetric key of the data owner to obtain an encrypted target symmetric key, and the target symmetric key of the data owner is used to generate the target encrypted shared file;

a second generation module, configured to generate, through a proxy re-encryption method, a proxy re-encryption key based on the target asymmetric public key of the data user and the target asymmetric private key of the data owner;

a first transmission module, configured to transmit the proxy re-encryption key to a cloud storage service system, such that the cloud storage service system obtains proxy re-encrypted data by performing proxy encryption on the encrypted target symmetric key based on the proxy re-encryption key, and transmits the proxy re-encrypted data and the target encrypted shared file to the data user;

wherein the key updating method includes: acquiring a target root key and an auxiliary target root key; acquiring identity information of the data owner of target data; acquiring the target timestamp when the target data is encrypted; acquiring a key generation parameter and an auxiliary key that are generated at a timestamp previous to the target timestamp; and generating the target private key of the data owner based on the key generation parameter at the timestamp previous to the target timestamp, the auxiliary key at the timestamp previous to the target timestamp, the identity information and the target timestamp, wherein the key generation parameter generated at a timestamp previous to a starting timestamp is the target root key, and the auxiliary key generated at the timestamp previous to the starting timestamp is the auxiliary target root key;

wherein the generating the target private key of the data owner based on the key generation parameter at the timestamp previous to the target timestamp, the auxiliary key at the timestamp previous to the target timestamp, the identity information and the target timestamp includes: generating key metadata at the target timestamp by performing a Hash operation on the key generation parameter generated at the timestamp previous to the target timestamp and the auxiliary key generated at the timestamp previous to the target timestamp; generating the auxiliary key at the target timestamp by performing a Hash operation on the auxiliary key generated at the timestamp previous to the target timestamp and the target timestamp; and generating the target private key of the data owner based on a first half of the key metadata at the target timestamp, the auxiliary key at the target timestamp, the identity information and the target timestamp, wherein the key generation parameter generated at the timestamp previous to the target timestamp is a second half of the key metadata generated at the timestamp previous to the target timestamp.

An electronic device, including:

a memory, configured to store a computer program therein; and a processor, configured to implement steps of any one of the methods described above while executing the computer program.

A computer-readable storage medium storing a computer program that, when being executed by a processor, implements steps of any one of the methods described above.

BRIEF DESCRIPTION OF THE DRAWINGS

To describe embodiments of the present disclosure or technical solutions in the related art more clearly, accompanying drawings required for describing the embodiments or the related art briefly introduced below. Apparently, the accompanying drawings in the following description show merely embodiments of the present disclosure, and those skilled in the art may further obtain other drawings based on these accompanying drawings without creative efforts.

DETAILED DESCRIPTION OF THE EMBODIMENTS

The technical solutions in the embodiments of the present disclosure will be described clearly and thoroughly below in conjunction with accompanying drawings of the present disclosure. Apparently, the described embodiments are merely some embodiments, rather than all embodiments, of the present disclosure. All other embodiments obtained, based on the embodiments of the present disclosure, by those skilled in the art without creative efforts shall fall within the protection scope of the present disclosure.

In a cloud data encryption system, users may frequently use keys for encryption and decryption operations, resulting in a certain probability of key leakage risks. Meanwhile, insecure channel transmission of the keys, localized caching or storage of the keys by users, non-compliant operations during the encryption and decryption processes, an attack to a key management system or others may also lead to key leakage, which in turn leads to the risk of malicious theft of user data. In order to ensure the data security, a user key may be updated. For example, a key at a current moment is generated directly based on a key at a previous moment. However, such key updating method makes the bond between keys strong, such that attackers may infer the next key based on the key generated at each moment, resulting in low key security.

How to improve the security of key updates is a problem to be solved by those skilled in the art.

Figure 1:
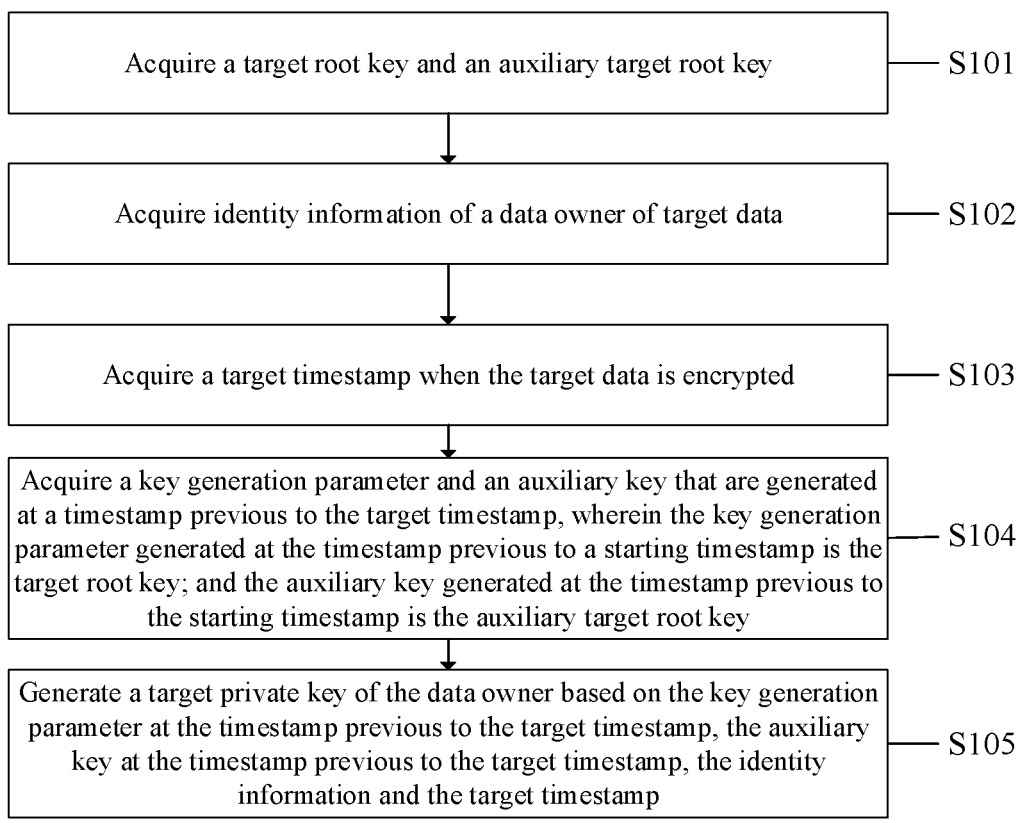
FIG. 1 is a first flowchart of a key updating method provided by an embodiment of the present disclosure.

Referring to FIG. 1, FIG. 1 is a first flowchart of a key updating method provided by an embodiment of the present disclosure.

An embodiment of the present disclosure provides a key updating method, including the following steps S101-S105.

At S101, a target root key and an auxiliary target root key are acquired.

In practice, the target root key and the auxiliary target root key used for generating a target private key may be acquired first. Of course, the target root key and the auxiliary target root key may also be generated directly, and generation methods of the target root key and the auxiliary target root key may be determined according to actual needs.

In certain application scenarios, in order to ensure the security of the target root key and the auxiliary target root key, the target root key and the auxiliary target root key may be saved in an independent media such as a U-KEY. Accordingly, the target root key and the auxiliary target root key may be acquired from the independent media such as a U-KEY.

At S102, identity information of a data owner of target data is acquired.

In practice, since the target private key is generally used to encrypt data of the data owner, the target private key generally belongs to the data owner himself or herself. Therefore, the identity information of the corresponding data owner may be introduced in the generation process of the target private key, that is, the identity information of the data owner of the target data may be acquired after the target root key and the auxiliary target root key are acquired. The type of identity information may be determined according to actual needs. For example, the identity information may be a user's ID, an ID number, or the like.

At S103, a target timestamp when the target data is encrypted is acquired.

In practice, in the process of generating the target private key, the target private key may be combined with time, so that the generated target private key changes over time and the target private key is more difficult to be cracked. That is, the target timestamp when the target data is encrypted also needs to be acquired in the present disclosure.

At S104, a key generation parameter and an auxiliary key generated at a timestamp previous to the target timestamp are acquired, wherein the key generation parameter generated at a timestamp previous to a starting timestamp is the target root key; and the auxiliary key generated at the timestamp previous to the starting timestamp is the auxiliary target root key.

In practice, in the key updating process ; private key information at the previous timestamp needs to be used. Therefore, after acquiring the target timestamp when the target data is encrypted, the key generation parameter and the auxiliary key generated at the timestamp previous to the target timestamp also need to be acquired, wherein the key generation parameter generated at the timestamp previous to the starting timestamp is the target root key; and the auxiliary key generated at the timestamp previous to the starting timestamp is the auxiliary target root key.

At S105, a target private key of the data owner is generated based on the key generation parameter at the timestamp previous to the target timestamp, the auxiliary key at the timestamp previous to the target timestamp, the identity information and the target timestamp.

In practice, after the key generation parameter and the auxiliary key generated at the timestamp previous to the target timestamp are acquired, the target private key of the data owner may be generated based on the key generation parameter at the timestamp previous to the target timestamp, the auxiliary key at the timestamp previous to the target timestamp, the identity information and the target timestamp, so that the target private key may be subsequently applied for file sharing, file encryption and other adaptive operations.

In certain application scenarios, after the target private key is generated, a corresponding target public key and the like may also be generated based on the target private key, which will not be limited in the present disclosure. It should be noted that the key updating method in the present disclosure may be operated in a period of time. For example, this method is started again after being performed for N times. In addition, the target root key and the auxiliary target root key used for each round of operation may be different, which will not be limited in the present disclosure.

The present disclosure provides a key updating method, including: acquiring a target root key and an auxiliary target root key; acquiring identity information of a data owner of target data; acquiring a target timestamp when the target data is encrypted; acquiring a key generation parameter and an auxiliary key that are generated at a timestamp previous to the target timestamp; and generating a target private key of the data owner based on the key generation parameter and auxiliary key of the timestamp previous to the target timestamp, the identity information, and the target timestamp, wherein the key generation parameter generated at a timestamp previous to a starting timestamp is the target root key, and the auxiliary key generated at the timestamp previous to the starting timestamp is the auxiliary target root key. According to the present disclosure, the identity information and the target timestamp are introduced in the process of generating the target private key, and the identity information and the target timestamp are variable information, so that the process of generating the target private key at the target timestamp based on the key generation parameter and auxiliary key at the timestamp previous to the target timestamp is difficult to be cracked, and thus, the generation security of the target private key is improved.

Figure 2:
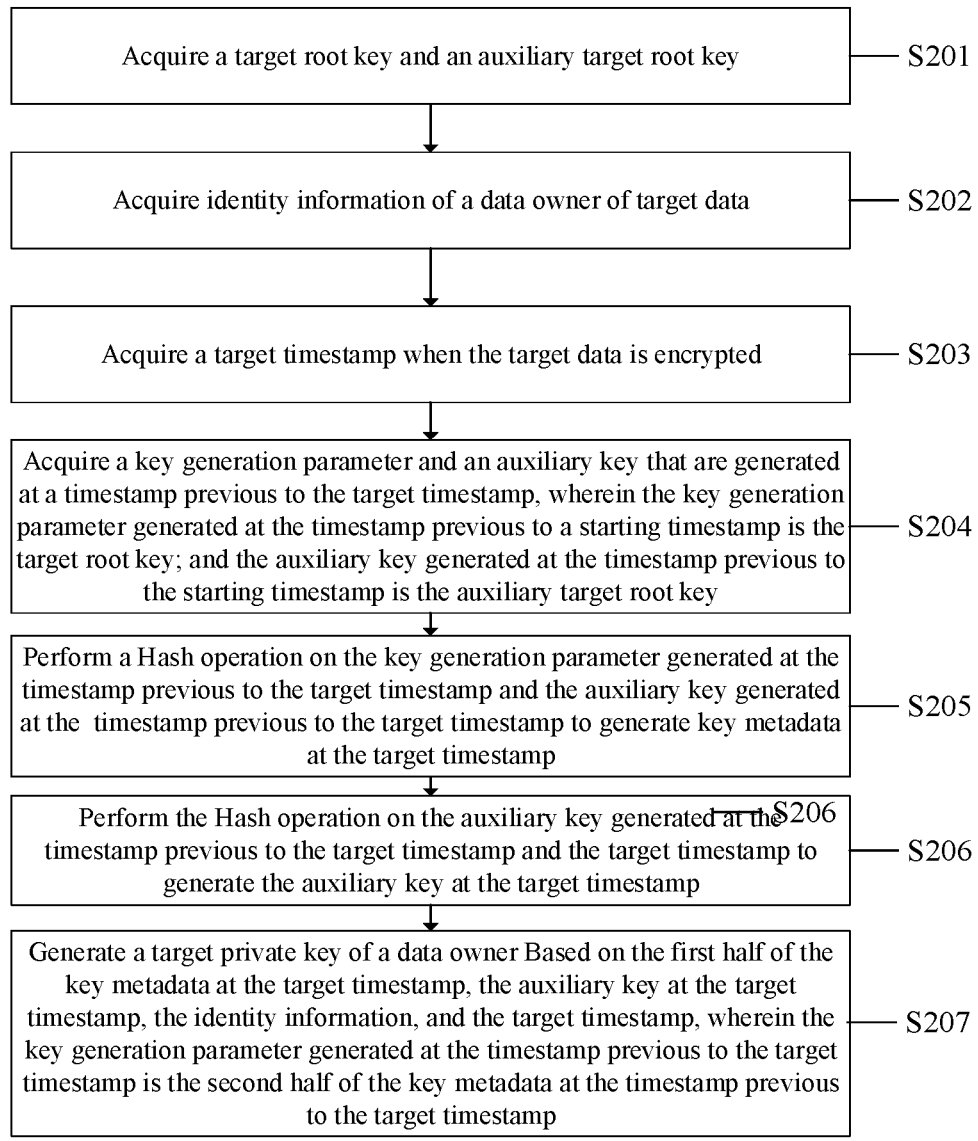
FIG. 2 is a second flowchart of a key updating method provided by an embodiment of the present disclosure.

Referring to FIG. 2, FIG. 2 is a second flowchart of a key updating method provided by an embodiment of the present disclosure.

An embodiment of the present disclosure provides a key updating method, including the following steps.

At S201, a target root key and an auxiliary target root key are acquired.

At S202, identity information of a data owner of target data is acquired.

At S203, a target timestamp when the target data is encrypted is acquired.

At S204, a key generation parameter and an auxiliary key generated at a timestamp previous to the target timestamp are acquired, wherein the key generation parameter generated at the timestamp previous to a starting timestamp is the target root key; and the auxiliary key generated at the timestamp previous to the starting timestamp is the auxiliary target root key.

At S205, key metadata at the target timestamp is generated by performing a Hash operation on the key generation parameter generated at the timestamp previous to the target timestamp and the auxiliary key generated at the timestamp previous to the target timestamp.

In practice, in response to acquiring the key generation parameter generated at the timestamp previous to the target timestamp and the auxiliary key generated at the timestamp previous to the target timestamp, in the process of generating the target private key of the data owner based on the key generation parameter at the timestamp previous to the target timestamp, the auxiliary key at the timestamp previous to the target timestamp, the identity information, and the target timestamp, the Hash operation may be performed on the key generation parameter generated at the timestamp previous to the target timestamp and the auxiliary key generated at the timestamp previous to the target timestamp to generate the key metadata at target timestamp.

At S206, an auxiliary key at the target timestamp is generated by performing a Hash operation on the auxiliary key generated at the timestamp previous to the target timestamp and the target timestamp.

In practice, after the key metadata at the target timestamp is generated ; the Hash operation may be performed on the auxiliary key generated at the timestamp previous to the target timestamp and the target timestamp to generate the auxiliary key at the target timestamp.

At S207, a target private key of the data owner is generated based on a first half of the key metadata at the target timestamp, the auxiliary key at the target timestamp, the identity information and the target timestamp, wherein the key generation parameter generated at the timestamp previous to the target timestamp is a second half of the key metadata at the timestamp previous to the target timestamp.

In practice, after the auxiliary key at the target timestamp is generated, the target private key of the data owner may be generated based on the first half of the key metadata at the target timestamp, the auxiliary key at the target timestamp, the identity information and the target timestamp, It should be noted that the key generation parameter generated at the timestamp previous to the target timestamp is the second half of the key metadata at the timestamp previous to the target timestamp; the key generation parameter generated at the previous timestamp of a starting timestamp is the target root key; and the auxiliary key generated at the timestamp previous to the starting timestamp is the auxiliary target root key. In addition, the Hash algorithm in the present disclosure may be a hash-based message authentication code (HMAC) algorithm or other algorithms.

In certain application scenarios, in the process of generating the target private key of the data owner based on the first half of the key metadata at the target timestamp, the auxiliary key at the target timestamp, the identity information, and the target timestamp, a Hash value of the identity information and the target timestamp may be calculated; a product value of the auxiliary key at the target timestamp and the Hash value may be calculated; and a sum of the first half of the key metadata at the target timestamp and the product value may be used as the target private key of the data owner, In certain application scenarios, types of the target private key may include a target symmetric key, and a target asymmetric private key, wherein in a case that the target private key is the target symmetric key, the target root key is a target symmetric root key, the auxiliary target root key is an auxiliary symmetric root key, and the auxiliary key is an auxiliary symmetric key; and in a case that the target private key is the target asymmetric private key, the target root key is a target asymmetric root key, the auxiliary target root key is an auxiliary asymmetric root key, and the auxiliary key is an auxiliary asymmetric key. It should be noted, in a case that the target private key is the target asymmetric private key, a corresponding target asymmetric public key and the like may also be generated according to the target asymmetric private key by using known technologies, which will not be limited in the present disclosure.

Figure 3:
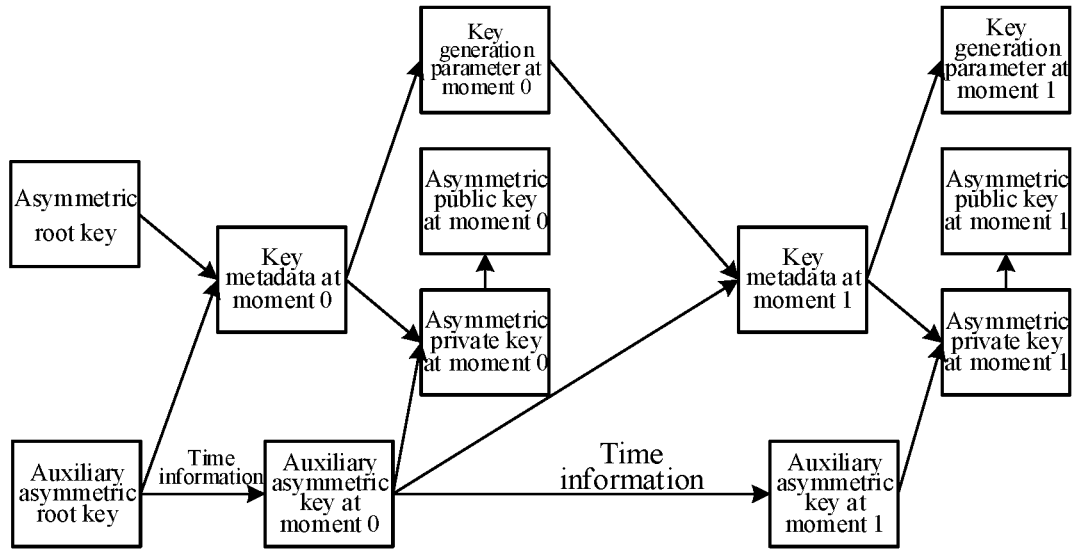
FIG. 3 is a schematic diagram illustrating generation of a target asymmetric private key and a target asymmetric public key.

For ease of understanding, assuming the starting timestamp is moment 0, a generation process of a target asymmetric private key and a target asymmetric public key may be shown in FIG. 3. As shown in FIG. 3, an HMAC operation is performed on a target asymmetric root key and an auxiliary asymmetric root key to obtain key metadata at moment 0; the Hash operation is performed on the auxiliary asymmetric root key and a timestamp at moment 0 to generate an auxiliary key at moment 0, that is, an auxiliary asymmetric key; a Hash value of the identity information and the timestamp at moment 0 is calculated; a product value of the auxiliary key at moment 0 and the Hash value is calculated; a sum of the first half of the key metadata at moment and the product value may be used as a target asymmetric private key of the data owner at moment 0; then, an asymmetric public key at moment 0 is determined based on the target asymmetric private key; and the second half of the key metadata at moment 0 is used as a key generation parameter at moment 0. Correspondingly ; key metadata at moment 1 may be obtained by performing HMAC on the key generation parameter at moment 0 and the auxiliary asymmetric key at moment 0, and an auxiliary asymmetric key at moment 1 may be obtained from the auxiliary asymmetric key and time information at moment 0; and then, the target asymmetric private key at moment 1 may be determined, and by analogy, the target asymmetric private key and public key at each moment may be obtained.

Figure 4:
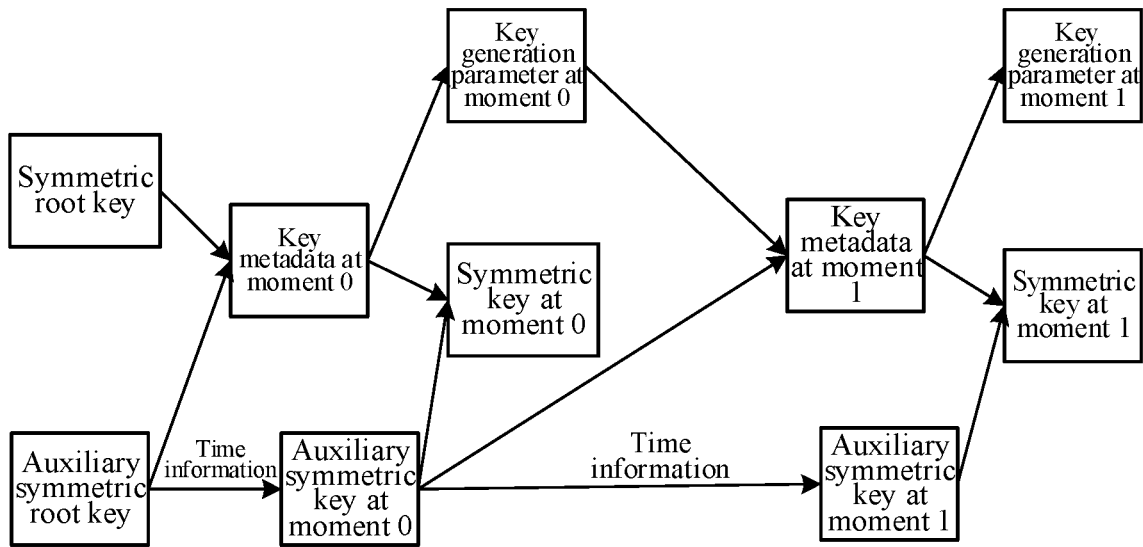
FIG. 4 is a schematic diagram illustrating generation of a target symmetric private key and a target symmetric public key.

Correspondingly, a generation process of a target symmetric private key and a target symmetric public key may be shown in FIG. 4. As shown in FIG. 4, an HMAC operation is performed on a target symmetric root key and an auxiliary symmetric root key to obtain the key metadata at moment 0; the Hash operation is performed on the auxiliary symmetric root key and a timestamp at moment 0 to generate an auxiliary key at moment 0, that is, an auxiliary symmetric key; a Hash value of the identity information and the timestamp at moment 0 is calculated; a product value of the auxiliary key at moment 0 and the Hash value is calculated; a sum of the first half of the key metadata at moment 0 and the product value is used as a target symmetric private key of the data owner at moment 0; then, a symmetric public key at moment 0 is determined based on the target symmetric private key; and the second half of the key metadata at moment 0 is used as the key generation parameter at moment 0. Correspondingly, the key metadata at moment 1 may be obtained by performing HMAC on the key generation parameter at moment 0 and the auxiliary asymmetric key at moment 0, and an auxiliary asymmetric key at moment 1 may be obtained from the auxiliary asymmetric key and time information at moment 0; and then, the target symmetric private key at moment 1 may be determined, and by analogy, the target asymmetric private key and public key at each moment may be obtained.

In a cloud computing environment, data stored in cloud computing by a user is not only used by the user itself, but sometimes needs to be shared with others for use. That is, there are scenarios where a large amount of data is shared in the cloud environment. Since the data owner does not fully trust in a cloud service provider, a key to decrypt a ciphertext cannot be transmitted to the cloud to decrypt and share the ciphertext by the cloud. How to ensure that a file can be shared safely and efficiently with other users without revealing their private keys has become a research hotspot for cloud computing platforms. In a traditional solution, a data owner downloads and decrypts a ciphertext, and then encrypts the decrypted ciphertext with a public key of a data receiver and shares the same, which undoubtedly brings great trouble to the data owner and also loses the meaning of cloud data sharing. Then, how to ensure that a file can be shared safely is a technical problem required to be solved. In order to solve this technical problem, an embodiment of the present disclosure further provides a file sharing method.

Figure 5:
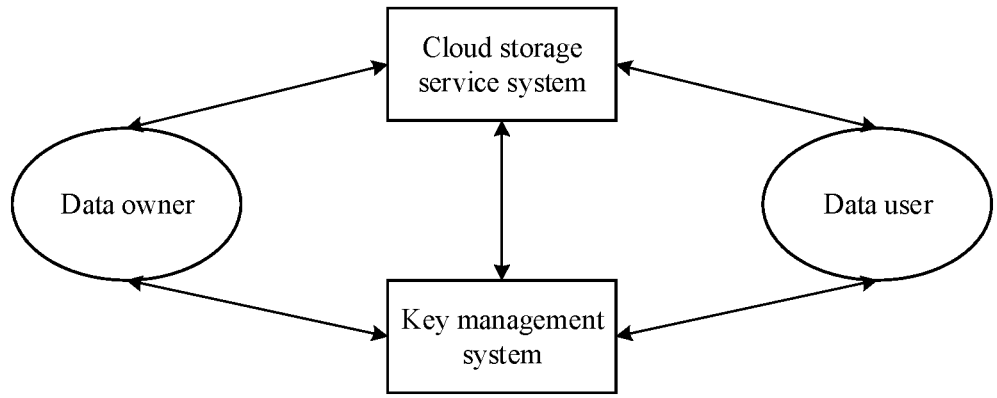
FIG. 5 is an architecture diagram of a cloud environment.

For ease of understanding, the cloud computing environment is described now. Referring to FIG. 5, FIG. 5 is a schematic architecture diagram of a cloud environment. In the cloud computing environment, a key management system is used for the generation, update and storage of a symmetric key; the generation, update and storage of an asymmetric key; the generation of a proxy re-encryption key; the generation and storage of a symmetric root key; the generation and storage of an asymmetric root key; the generation, update and storage of an auxiliary key for the symmetric key; the generation, update and storage of an auxiliary key for the asymmetric key; the generation and storage of an auxiliary root key for the symmetric key; and the generation and storage of an auxiliary root key for the asymmetric key.

The data owner is responsible for the generation of a shared file, performs a symmetrical encryption on the shared file by using the symmetric key generated in the key management system to obtain an encrypted shared file, encrypts the symmetric key by using a public key of the asymmetric key generated in the key management system, and then uploads the encrypted shared file and the encrypted symmetric key to a cloud storage service system. It should be noted that the data owner has a permission to download an encrypted file uploaded by himself or herself, decrypt the encrypted tile, and perform data update and deletion or other operations. During the updating process, the data owner re-encrypts the updated file with an updated symmetric key within a current time period, re-encrypts the symmetric key with an updated asymmetric public key within the current time period, and updates the encrypted symmetric key and the encrypted shared file to the cloud storage service management system. In the case of retrieving a shared file in the cloud computing environment, the data owner may encrypt a keyword of the file using the public key and then upload it to the cloud storage management system. The data owner uses a private key to encrypt the keyword to generate a search trapdoor while searching for the corresponding ciphertext, uploads the search trapdoor to a cloud storage server, and performs a ciphertext search. Correspondingly, the cloud storage service system performs a ciphertext test on the uploaded search trapdoor and the encrypted keyword to determine whether it contains the file corresponding to the keyword. In addition, in the case of uploading a shared file, the data owner may also specify an authorized sharing user in the metadata of the corresponding asymmetric key in the key management system to ensure that the specified authorized data user has a permission to use the shared file and deny a data user without permission to access the shared encrypted file.

Figure 6:
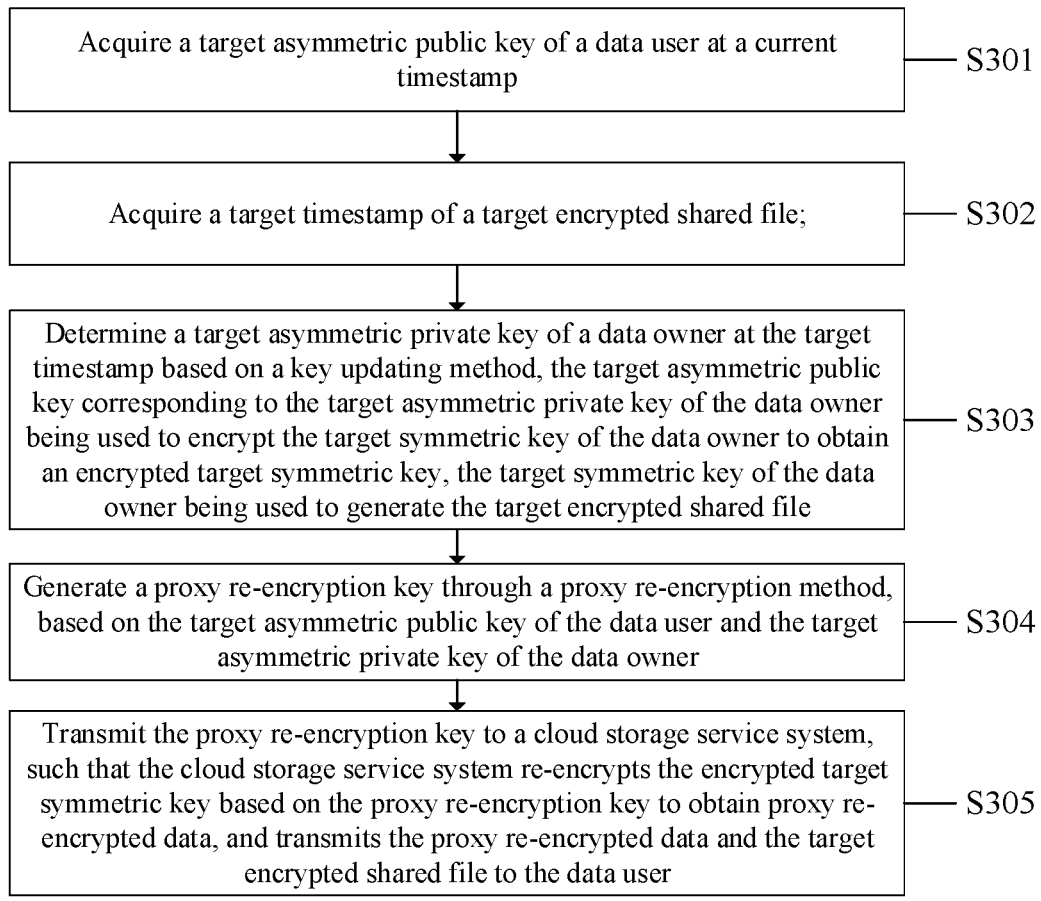
FIG. 6 is a flowchart of a file sharing method provided by an embodiment of the present disclosure.

The cloud storage service system is used for the storage of the encrypted data and the execution of proxy re-encryption. The cloud storage service system stores the encrypted shared file and the corresponding encrypted symmetric key, which are uploaded by the data owner. It should be noted that a large file in cloud storage consists of a plurality of small files, and a user may download and update a small file each time. Therefore, each small file of the large file records its last update time, which is used to identify the corresponding symmetric key and the corresponding asymmetric key. Referring to FIG. 6, FIG. 6 is a flowchart of a file sharing method provided by an embodiment of the present disclosure.

An embodiment of the present disclosure provides a tile sharing method, which is applied to a key management system and may include the following steps S301-S305.

At S301, a target asymmetric public key of a data user at a current timestamp is acquired.

In practice, since the data user wants to acquire target data owned by the data owner, and a proxy re-encryption method is generally used for file sharing, the key management system needs to acquire the data user's target asymmetric public key when he needs to acquire data, that is, the target asymmetric public key at the current timestamp.

In some embodiments, the cloud storage service system may acquire a file sharing request from the data user, determine identity information of the data user according to the file sharing request, and transmit the identity information of the data user to the key management system. The key management system then acquires the data user's target asymmetric public key at the latest target timestamp according to the identity information of the data user.

At S302, a target timestamp of a target encrypted shared file is acquired.

In practice, since the data user needs to use the shared file in the cloud storage service system, the shared file is encrypted by the data owner, and a key used for encryption is updated in accordance with the key updating method described in the above embodiment, the key management system needs to acquire a target timestamp of the target encrypted shared file, that is, a timestamp when the target encrypted shared file is encrypted.

At S303, the target asymmetric private key of the data owner at the target timestamp is determined through the key updating method, the target asymmetric public key corresponding to the data owner's target asymmetric private key being used to encrypt the target symmetric key of the data owner to obtain an encrypted target symmetric key, the target symmetric key of the data owner being used to generate the target encrypted shared file.

In practice, since the data owner encrypts the shared file using the his/her symmetric key and then encrypts the symmetric key using the his/her asymmetric public key, and the symmetric key and the asymmetric private key corresponding to the asymmetric public key are both updated according to the key updating method, the target symmetric key for encrypting the shared file changes with a timestamp. Therefore, after the latest target timestamp of the target encrypted shared file is acquired, the data owner's target asymmetric private key at the target timestamp needs to be determined through the key updating method. In addition, the target asymmetric public key corresponding to the target asymmetric private key of the data owner is used to encrypt the target symmetric key of the data owner to obtain the encrypted target symmetric key, and the target symmetric key of the data owner is used to generate the target encrypted shared file.

At S304, a proxy re-encryption key is generated, through a proxy re-encryption method, based on the target asymmetric public key of the data user and the target asymmetric private key of the data owner.

In practice, once the target asymmetric private key is determined, the proxy re-encryption key may be generated based on the target asymmetric public key of the data user and the target asymmetric private key of the data owner through the proxy re-encryption method. This process may refer to the related art, and will not be limited in the present disclosure. For example, the process of generating the proxy re-encryption key may be as follows.

Assuming that an elliptic curve cyclic addition group of an order q used to determine a key is $G_1$, a bilinear map formed by $G_1$ is $e:G_1 \times G_1 \rightarrow G_T$; a base point $P \in G_1$, $Z = e(P, P) \in G_T$ of an elliptic curve is generated randomly, the bilinear map has a property of $e(aP, bP) = e(P,P)^{ab}$, an asymmetric private key of the data owner at moment t1, that is, at the target timestamp, is $sk_{60\_a} \alpha_{t1}$, $\alpha_{t1} \in Z_q$, a corresponding asymmetric public key is $Pk_{\alpha_{t1}} = \alpha_{t1}P$, a symmetric key is $k_{t1} \in G_T$, and $r \in Z_q$ is randomly selected for symmetric key encryption to obtain a ciphertext $C_2 = (C_{21}, C_{22}) = (\alpha_{t1}rP, k_{t1}Z^r)$; assuming that the data user acquires the symmetric key $k_{t1}$ at moment t2(t2≥t1), that is, at the current timestamp, the symmetric key is used to decrypt the shared data file; and assuming the asymmetric private key of the data user at the moment is $sk_{b_{t2}}=b_{t2}$, $b_{t2}\in Z_q$ and the corresponding asymmetric public key is $pk_{b_{t2}}=b_{t2}P$, then the process of generating the proxy re-encryption key may be as follows:

$rk_{\alpha_{t1}\to b_{t2}}=(b_{t2}/\alpha_{t1})P=(1/\alpha_{t1})pk_{b_{t2}}$, wherein represents the proxy re-encryption key.

At S305, the proxy re-encryption key is transmitted to the cloud storage service system, such that the cloud storage service system re-encrypts the encrypted target symmetric key based on the proxy re-encryption key to obtain proxy re-encrypted data, and transmits the proxy re-encrypted data and the target encrypted shared file to the data user.

In practice, after being generated, the proxy re-encryption key may be transmitted to the cloud storage service system, such that the cloud storage service system performs proxy re-encryption on the encrypted target symmetric key based on the proxy re-encryption key to obtain proxy re-encrypted data, and the proxy re-encrypted data and the target encrypted shared file are transmitted to the data user.

That is, after acquiring the proxy re-encryption key, the cloud storage service system may apply the proxy re-encryption key to perform proxy re-encryption on the encrypted target symmetric key to obtain the proxy re-encrypted data, and transmit the proxy re-encrypted data and the target encrypted shared file to the data user; and the data user then uses its own target asymmetric private key to decrypt the proxy re-encrypted data to obtain the target symmetric key of the data owner, and then uses the target symmetric key to decrypt the target encrypted shared file to obtain the corresponding target data.

Taking the above proxy re-encryption key generation process as an example, the cloud storage service system uses the proxy re-encryption key to perform proxy re-encryption on the encrypted target symmetric key, and the process is as follows:

$C_3=(C_{31},C_{32})=(e(\alpha_{t1}rP,(b_{t2}/\alpha_{t1})P),k_{t1}Z^r)=(Z^{b_{t2}r},k_{t1}Z^r)$, wherein $C_3$ represents the proxy re-encrypted data.

The data user uses its own target asymmetric private key to decrypt the proxy re-encrypted data through the following formula to obtain the target symmetric key of the data owner $$k_{t1}=\frac{k_{t1}Z^r}{(Z^{b_{t2}r})^{1/b_{t2}}}.$$

According to the file sharing method provided by the embodiment of the present disclosure, before the key management system acquires the data user's target asymmetric public key at a current timestamp, the key management system may performing operations of: acquiring the data user's identity information sent by the cloud storage service system; acquiring authorized user information set by the data owner on metadata of an asymmetric key; determining whether the data user's identity information is in the authorized user information; determining that the data user has a permission to use the target encrypted shared file in response to the data user's identity information being in the authorized user information, and performing the step of acquiring the data user's target asymmetric public key at the latest target timestamp; or determining that the data user has no permission to use the target encrypted shared file in response to the data user's identity information being not in the authorized user information, and the entire method may end at this time.

Figure 7:
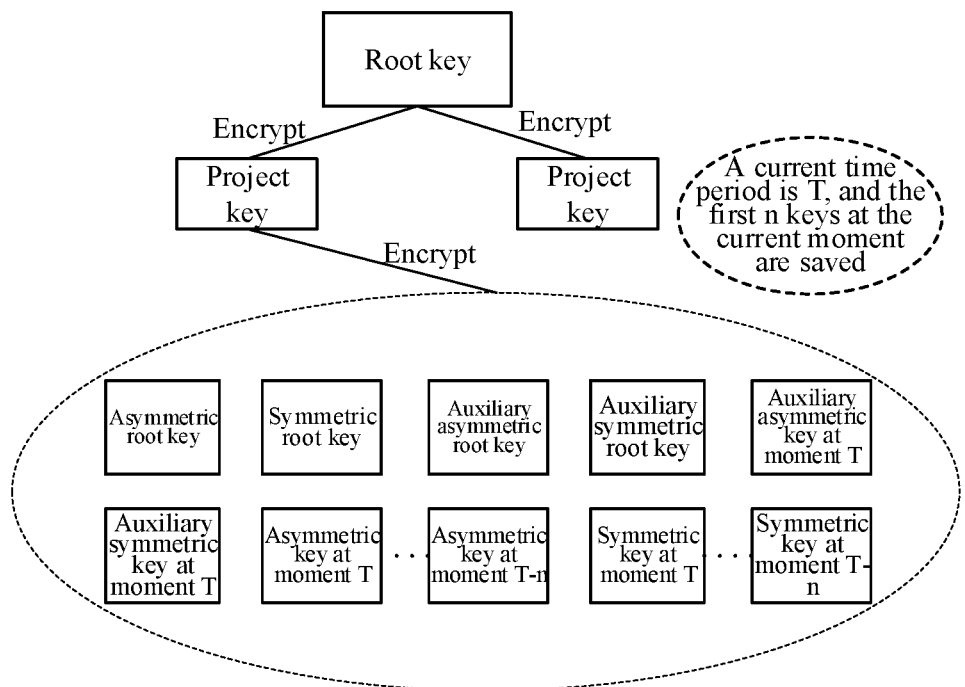
FIG. 7 is a schematic diagram illustrating storage of a key management system.

In certain application scenarios, the key management system may be used to save the corresponding parameters in the entire method. For example, the key management system may generate a root key and a project key, encrypt the project key with the root key, and encrypt the corresponding parameters with the project key, e.g., encrypt the asymmetric root key, the symmetric root key, the auxiliary asymmetric root key and the like with the project key, the addition, in order to avoid the process of saving key information, the key management system may only save the first n keys at the current moment, etc., and the process may be shown in FIG. 7.

Figure 8:
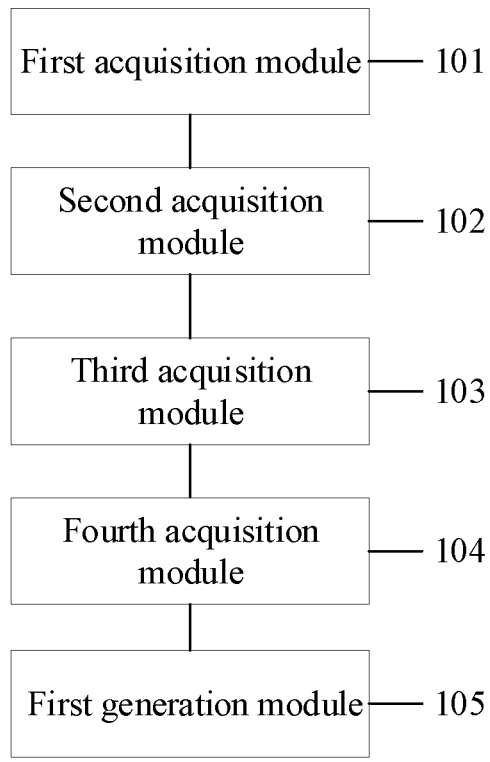
FIG. 8 is a schematic structural diagram of a key updating apparatus provided by an embodiment of the present disclosure.

Referring to FIG. 8, FIG. 8 is a schematic structural diagram of a key updating apparatus provided by an embodiment of the present disclosure.

The key updating apparatus provided by the embodiment of the present disclosure may include:

a first acquisition module 101, configured to acquire a target root key and an auxiliary target root key;

a second acquisition module 102, configured to acquire identity information of a data. owner of target data;

a third acquisition module 103, configured to acquire a target timestamp when the target data is encrypted;

a fourth acquisition module 104, configured to acquire a key generation parameter and an auxiliary key that are generated at a timestamp previous to the target timestamp; and a first generation module 105, configured to generate a target private key of the data owner based on the key generation parameter at the timestamp previous to the target timestamp, the auxiliary key at the timestamp previous to the target timestamp, the identity information and the target timestamp, wherein the key generation parameter generated at the timestamp previous to a starting timestamp is the target root key; and the auxiliary key generated at the timestamp previous to the starting timestamp is the auxiliary target root key.

In the key updating apparatus provided by an embodiment of the present disclosure, the first generation module may include:

a first generation unit, configured to generate key metadata at the target timestamp by performing a Hash operation on the key generation parameter generated at the timestamp previous to the target timestamp and the auxiliary key generated at the timestamp previous to the target timestamp;

a second generation unit, configured to generate the auxiliary key at the target timestamp by performing a Hash operation on the auxiliary key generated at the timestamp previous to the target timestamp and the target timestamp; and a third generation unit, configured to generate the target private key of the data owner based on a first half of the key metadata at the target timestamp, the auxiliary key at the target timestamp, the identity information and the target timestamp, wherein the key generation parameter generated at the timestamp previous to the target timestamp is a second half of the key metadata generated at the timestamp previous to the target timestamp.

In the key updating apparatus provided by an embodiment of the present disclosure, the third generation unit may be further configured to:

calculate a Hash value of the identity information and the target timestamp;

calculate a product value of the auxiliary key at the target timestamp and the Hash value; and use a sum of the first half of the key meta.data at the target timestamp and the product value as the target private key of the data owner.

According to the key updating apparatus provided by the embodiment of the present disclosure, the types of the target private key include a target symmetric key and a target asymmetric private key, wherein in a case that the target private key is the target symmetric key, the target root key is a target symmetric root key, and the auxiliary target root key is an auxiliary symmetric root key; and in a case that the target private key is the target asymmetric private key, the target root key is a target asymmetric root key, and the auxiliary target root key is an auxiliary asymmetric root key.

The key updating apparatus provided by the embodiment of the present disclosure may further include:

a public key generation module, configured to: after the target private key of the data owner is generated, based on the key generation parameter at the timestamp previous to the target timestamp, the auxiliary key at the timestamp previous to the target timestamp, the identity information and the target timestamp, by the first generation module, in response to the target private key being a target asymmetric private key, generate a target asymmetric public key based on the target asymmetric private key.

Figure 9:
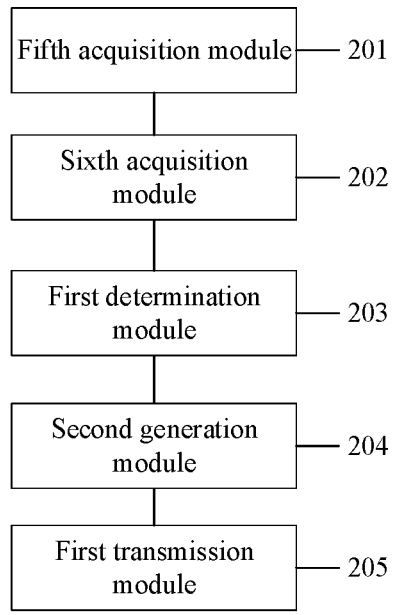
FIG. 9 is a schematic structural diagram of a file sharing apparatus provided by an embodiment of the present disclosure.

Referring to FIG. 9, FIG. 9 is a schematic structural diagram of a file sharing apparatus provided by an embodiment of the present disclosure.

The embodiment of the present disclosure provides a file sharing apparatus, which is applied to a key management system and includes:

a fourth acquisition module 201, configured to acquire a target asymmetric public key of a data user at a current timestamp;

a fifth acquisition module 202, configured to acquire a target timestamp of a target encrypted shared file;

a first determination module 203, configured to determine a target asymmetric private key of a data owner at the target timestamp through a key updating method, a target asymmetric public key corresponding to the target asymmetric private key of the data owner being used to encrypt a target symmetric key of the data owner to obtain an encrypted target symmetric key, the target symmetric key of the data owner being used to generate the target encrypted shared file;

a second generation module 204, configured to generate, through a proxy re-encryption method, a proxy re-encryption key based on the target asymmetric public key of the data user and the target asymmetric private key of the data owner; and a first transmission module 205, configured to transmit the proxy re-encryption key to a cloud storage service system, such that the cloud storage service system obtains proxy re-encrypted data by re-encrypting the encrypted target symmetric key based on the proxy re-encryption key, and transmits the proxy re-encrypted data and the target encrypted shared file to the data user.

In the file sharing apparatus applied to a key management system, provided by the embodiment of the present disclosure, the second generation module may be further configured to:

use proxy re-encryption method to generate, based on the target asymmetric public key of the data user and the target asymmetric private key of the data owner ; the proxy re-encryption key according to a proxy re-encryption key generation formula. The proxy re-encryption key generation formula includes:

$$rk_{a_{t1} \to b_{t2}} = (1/a_{t1})pk_{b_{t2}};$$

wherein $rk_{a_{t1} \to b_{t2}}$ represents the proxy re-encryption key; $t_1$ represents the target timestamp; au represents the target asymmetric private key of the data owner; $t_2$ represents the current timestamp; $pk_{b_{t2}}$ represents the target asymmetric public key of the data user; $pk_{b_{t2}} = b_{t2}P$, $b_{t2}$ represents the target asymmetric private key of the data user; and P represents a base point of a pre-generated elliptic curve.

The file sharing apparatus, applied to a key management system, provided by the embodiment of the present disclosure may further include:

a sixth acquisition module ; configured to acquire identity information of the data user transmitted from the cloud storage service system prior to acquiring, by the fourth acquisition module, a target asymmetric public key of the data user at the latest target timestamp;

a seventh acquisition module ; configured to acquire authorized user information set by the data owner on metadata of an asymmetric key; and a first determination module, configured to determine whether the identity information of the data user is in authorized user information; determine that the data user has a permission to use the target encrypted shared file in response to the identity information of the data user being in the authorized user information, and prompt the fourth acquisition module to perform the step of acquiring the target asymmetric public key of the data user at the latest target timestamp.

Figure 10:
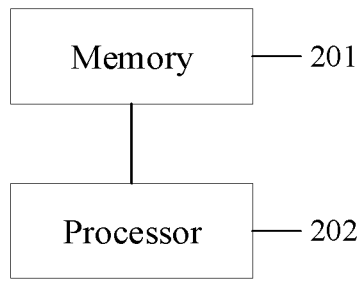
FIG. 10 is a schematic structural diagram of an electronic device provided by an embodiment of the present disclosure.

The present disclosure further provides an electronic device and a computer-readable storage medium, both of which have the corresponding effects owned by the key updating method and the file sharing method provided by the embodiments of the present disclosure. Referring to FIG. 10, FIG. 10 is a schematic structural diagram of an electronic device according to an embodiment of the present disclosure, An embodiment of the present disclosure provides an electronic device including a processor 202 and a memory 201 storing a computer program that, when executed by the processor 202, causes the processor to implement the steps described in any of the above embodiments.

Figure 11:
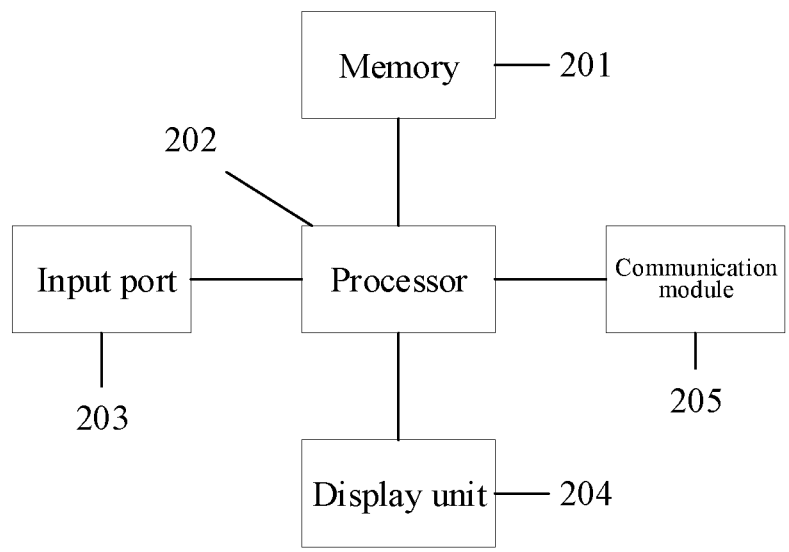
FIG. 11 is a schematic structural diagram of an electronic device provided by an embodiment of the present disclosure.

Referring to FIG. 11, another electronic device provided by an embodiment of the present disclosure may also include: an input port 203 connected to the processor 202 and configured to transmit a command from external input to the processor 202; a display unit 204 connected to the processor 202 and configured to display processing results of the processor 202 to the outside; and a communication module 205 connected to the processor 202 and configured to communicate with the outside. The display unit 204 may be a display panel, a laser scanning display, or the like. The communication methods adopted by the communication module 205 includes but are not limited to: a mobile high-definition link technology (HML), a universal serial bus (USB), a high-definition multimedia interface (HDMI), wireless connection: a wireless fidelity technology (WiFi), a Bluetooth communication technology, a Bluetooth low energy communication technology, and an IEEE802.11s-based communication technology.

An embodiment of the present disclosure further provides a computer-readable storage medium configured to store a computer program therein, the computer program, when executed by a processor, being configured to implement the steps of the method described in any of the above embodiments.

The computer-readable storage medium involved in this application includes random access memory (RAM), internal memory, read-only memory (ROM), electrically programmable ROM, electrically erasable programmable ROM, registers, hard disk, removable disk, CD-ROM, or any other form of storage medium known in the related art.

For descriptions of the relevant parts of the key updating apparatus and file sharing apparatus, the electronic device, and the computer-readable storage medium provided in the embodiment of the present disclosure, please refer to the corresponding part of the key updating method and file sharing method provided in the embodiment of the present disclosure, and detailed description thereof will not be repeated here. In addition, the parts of the technical solutions provided in the embodiments of the present disclosure that are consistent with the implementation principles of the corresponding technical solutions in the related art are not described in detail, to avoid repeated description.

It should also be noted that relational terms such as "first", "second" as used herein are merely used to distinguish an object or operation from another object or operation, and are not necessarily used to describe or imply that such an actual relationship or sequence exists between theses objects and operations. Furthermore, the terms "comprising" and "having", as well as any variations thereof, are intended to cover a non-exclusive inclusion, e.g. a process, method or apparatus comprising a series of steps or elements is not necessarily limited to those elements explicitly listed, but may include other elements not explicitly listed or inherent to the process, method or apparatus. Without further limitations, an element defined by the phrase "comprising a . . . " does not exclude the presence of additional identical elements in the process, method, article or apparatus comprising said element.

The above description of the disclosed embodiments is provided to enable those skilled in the art to make or use the present application. Various modifications to these embodiments will be readily apparent to those skilled in the art, and the general principles defined herein may be implemented in other embodiments without departing from the spirit or scope of the application. Therefore, the present application will not be limited to the embodiments herein, but is to be accorded the widest scope consistent with the principles and novel features disclosed herein.

The invention claimed is:

1. A key updating method, comprising:
    acquiring a target root key and an auxiliary target root key;
    acquiring identity information of a data owner of target data;
    acquiring a target timestamp when the target data is encrypted;
    acquiring a key generation parameter and an auxiliary key that are generated at a timestamp previous to the target timestamp; and
    generating a target private key of the data owner based on the key generation parameter at the timestamp previous to the target timestamp, the auxiliary key at the timestamp previous to the target timestamp, the identity information and the target timestamp, wherein the key generation parameter generated at a timestamp previous to a starting timestamp is the target root key; and the auxiliary key generated at the timestamp previous to the starting timestamp is the auxiliary target root key;
    wherein the generating a target private key of the data owner based on the key generation parameter at the timestamp previous to the target timestamp, the auxiliary key at the timestamp previous to the target timestamp, the identity information and the target timestamp comprises:
        generating key metadata at the target timestamp by performing a Hash operation on the key generation parameter generated at the timestamp previous to the target timestamp and the auxiliary key generated at the timestamp previous to the target timestamp;
        generating the auxiliary key at the target timestamp by performing a Hash operation on the auxiliary key generated at the timestamp previous to the target timestamp and the target timestamp; and
        generating the target private key of the data owner based on a first half of the key metadata at the target timestamp, the auxiliary key at the target timestamp, the identity information and the target timestamp,
    wherein the key generation parameter generated at the timestamp previous to the target timestamp is a second half of the key metadata generated at the timestamp previous to the target timestamp.

2. The method according to claim 1, wherein the generating the target private key of the data owner based on a first half of the key metadata at the target timestamp, the auxiliary key at the target timestamp, the identity information and the target timestamp comprises:
    calculating a Hash value of the identity information and the target timestamp;
    calculating a product value of the auxiliary key at the target timestamp and the Hash value; and
    using a sum of the first half of the key metadata at the target timestamp and the product value as the target private key of the data owner.

3. The method according to claim 2, wherein types of the target private key comprise a target symmetric key, and a target asymmetric private key, wherein
    in response to the target private key being the target symmetric key, the target root key is a target symmetric root key, and the auxiliary target root key is an auxiliary symmetric root key; and in response to the target private key being the target asymmetric private key, the target root key is a target asymmetric root key, and the auxiliary target root key is an auxiliary asymmetric root key.

4. The method according to claim 3, wherein after the generating a target private key of the data owner based on the key generation parameter at the timestamp previous to the target timestamp, the auxiliary key at the timestamp previous to the target timestamp, the identity information and the target timestamp, the method further comprises:
    in response to the target private key being the target asymmetric private key, generating a target asymmetric public key based on the target asymmetric private key.

5. An electronic device, comprising:
    a memory, configured to store a computer program therein; and
    a processor, configured to execute the computer program to implement operations of:
    acquiring a target root key and an auxiliary target root key;
    acquiring identity information of a data owner of target data;
    acquiring a target timestamp when the target data is encrypted;
    acquiring a key generation parameter and an auxiliary key that are generated at a timestamp previous to the target timestamp; and
    generating a target private key of the data owner based on the key generation parameter at the timestamp previous to the target timestamp, the auxiliary key at the timestamp previous to the target timestamp, the identity information and the target timestamp, wherein the key generation parameter generated at a timestamp previous to a starting timestamp is the target root key; and the auxiliary key generated at the timestamp previous to the starting timestamp is the auxiliary target root key;

wherein the generating a target private key of the data owner based on the key generation parameter at the timestamp previous to the target timestamp, the auxiliary key at the timestamp previous to the target timestamp, the identity information and the target timestamp comprises:

generating key metadata at the target timestamp by performing a Hash operation on the key generation parameter generated at the timestamp previous to the target timestamp and the auxiliary key generated at the timestamp previous to the target timestamp;

generating the auxiliary key at the target timestamp by performing a Hash operation on the auxiliary key generated at the timestamp previous to the target timestamp and the target timestamp; and generating the target private key of the data owner based on a first half of the key metadata at the target timestamp, the auxiliary key at the target timestamp, the identity information and the target timestamp, wherein the key generation parameter generated at the timestamp previous to the target timestamp is a second half of the key metadata generated at the timestamp previous to the target timestamp.

6. A non-transient computer-readable storage medium storing a computer program that, when being executed by a processor, implements steps of the method according to claim 1.

7. The electronic device according to claim 5, wherein the processor is further configured to perform operations of:

calculating a Hash value of the identity information and the target timestamp;

calculating a product value of the auxiliary key at the target timestamp and the Hash value; and using a sum of the first half of the key metadata at the target timestamp and the product value as the target private key of the data owner.

8. The electronic device according to claim 7, wherein types of the target private key comprise a target symmetric key, and a target asymmetric private key, wherein in response to the target private key being the target symmetric key, the target root key is a target symmetric root key, and the auxiliary target root key is an auxiliary symmetric root key; and in response to the target private key being the target asymmetric private key, the target root key is a target asymmetric root key, and the auxiliary target root key is an auxiliary asymmetric root key.

9. The electronic device according to claim 8, wherein the processor is further configured to perform operations of:

in response to the target private key being the target asymmetric private key, generating a target asymmetric public key based on the target asymmetric private key.

10. The electronic device according to claim 5, wherein the identity information is the data user's ID or ID number.

11. The method according to claim 1, wherein the identity information is the data user's ID or ID number.

* * * * *